United States Patent
Meloche et al.

(10) Patent No.: US 8,483,679 B2
(45) Date of Patent: Jul. 9, 2013

(54) SHARING OF ELECTROMAGNETIC-SIGNAL MEASUREMENTS FOR PROVIDING FEEDBACK ABOUT TRANSMIT-PATH SIGNAL QUALITY

(75) Inventors: Jean Meloche, Madison, NJ (US); Jay M. Stiles, Watchung, NJ (US)

(73) Assignee: Avaya Inc., Basking Ridge, NJ (US)

( * ) Notice: Subject to any disclaimer, the term of this patent is extended or adjusted under 35 U.S.C. 154(b) by 506 days.

(21) Appl. No.: 12/207,219

(22) Filed: Sep. 9, 2008

(65) Prior Publication Data

US 2010/0062756 A1 Mar. 11, 2010

(51) Int. Cl.
*H04W 24/00* (2009.01)

(52) U.S. Cl.
USPC .............. 455/423; 455/67.14; 455/414.4; 455/466; 704/231

(58) Field of Classification Search
USPC .......... 455/450, 67.11, 67.14, 466, 414.4, 455/423; 704/231
See application file for complete search history.

(56) References Cited

U.S. PATENT DOCUMENTS

| | | | |
|---|---|---|---|
| 6,243,568 B1 * | 6/2001 | Detlef et al. ............ | 455/226.4 |
| 2005/0250550 A1 | 11/2005 | Fields | |
| 2008/0181211 A1 | 7/2008 | Parolkar et al. | |
| 2008/0186957 A1 * | 8/2008 | Lai ........................ | 370/356 |
| 2009/0070109 A1 * | 3/2009 | Didcock et al. ............ | 704/235 |

FOREIGN PATENT DOCUMENTS

| | | |
|---|---|---|
| EP | 1111822 A2 | 6/2001 |
| EP | 1732295 | 12/2006 |
| KR | 200784773 | 8/2007 |
| WO | 02067472 A1 | 8/2002 |
| WO | WO 02/067472 | 8/2002 |
| WO | WO 2007/072414 | 6/2007 |
| WO | 2009035842 A1 | 3/2009 |
| WO | WO 2009/146249 | 12/2009 |

OTHER PUBLICATIONS

Lindsay, Jonas, "GB Application No. GB0822857.9 Search Report", Jan. 23, 2009, Published in: IPO.
Dr. Lochel, "DE Application No. 10 2008 061 741.5-31 Office Action Jul. 13, 2009", , Publisher: DPMA, Published in: DE.

* cited by examiner

*Primary Examiner* — Vladimir Magloire

(57) ABSTRACT

A technique is discloses that enables a first telecommunications terminal, wireless or otherwise, to report to its user whether a second, wireless telecommunications terminal is receiving the first terminal's packet stream transmissions at a satisfactory quality level. The second terminal receives the packet stream that conveys the media waveform transmitted by the first terminal. The media waveform can be that of the speech signal of the first terminal's user. The second terminal measures a trait of the received signal and encodes the measurement data into the packet stream that the second terminal is already transmitting to the first terminal. The first terminal then decodes the measurement data from the received second stream and presents, to its user, a quality indication that is based on the measurement data. In doing so, the first terminal provides its user with a better idea of whether the second terminal has reliably received the user's communication.

17 Claims, 4 Drawing Sheets

TELECOMMUNICATIONS SYSTEM 100

SHARING OF ELECTROMAGNETIC-SIGNAL MEASUREMENTS FOR PROVIDING FEEDBACK ABOUT TRANSMIT-PATH SIGNAL QUALITY

FIELD OF THE INVENTION

The present invention relates to telecommunications in general, and, more particularly, to verifying whether a signal that has been transmitted by a first telecommunications terminal has been satisfactorily received by a second, wireless telecommunications terminal.

BACKGROUND OF THE INVENTION

When people communicate with each other over a distance, there is often uncertainty as to whether the participants hear each other. The uncertainty can be attributed to noise or other forms of impairment that are present in the transmission path between the participants. The uncertainty in achieving successful communication is not specific to any one form of communication. This is evident, for example, in two-way radio communication for military, aerospace, or public service purposes, in which the participants are often forced to repeat what was heard. Additionally, in order to acknowledge and confirm the accuracy of the communication explicitly, the participants often have to use words such as "roger" to indicate that information has been received or "copy" to indicate that what was just said is understood. Even in cellular telecommunications, which comprises an adapted form of two-way radio communication, commercials and advertisements by the cellular service providers often feature themes of anxiety caused by a cell phone user not hearing someone else or of a service rep continually asking on his cell phone if someone else is able to hear him.

As alluded to above, radio communication is particularly vulnerable to impairments, which can come in the form of co-channel interference, Rayleigh fading, thermal noise, and so forth. Often, there is only one person who is using a wireless phone on a call, the other person being on a landline phone such as an office deskset. Increasingly, however, a call that involves a first wireless phone user will also involve a second wireless phone user. The scenario of two wireless phones can involve a cell phone and WiFi device, two cell phones, two WiFi devices, and so forth.

A wireless user often has some kind of signal strength indication that is typically based on measurements of a received signal's strength, which indication is then displayed at the phone. Sometimes, however, the indication suggests that a service provider's coverage area is better than it actually is. This can occur, for example, when a service provider boosts the power that is transmitted by the serving base station over the downlink to a wireless phone, leading a wireless user to think that the call quality is good, even though the carrier-to-impairment ratio of the downlink might still be unsatisfactory. In any event, the corresponding uplink might turn out to be far weaker or noisier, and so the wireless user does not know with any reasonable certainty whether the far-end party is hearing what is being said. Furthermore, if there are two wireless terminals involved in the call (i.e., one for each party), the first party really has only a rough idea, and probably an unreliable one, of what the far-end party is receiving, based on the displayed signal-strength indication.

Not surprisingly, a lot of effort has been spent on improving the robustness of communications and ensuring each participant in a conversation that the other person is, in fact, hearing him. In a Voice over Internet Protocol context, for example, protocols such as Real-time Transport Control Protocol (RTCP) have been developed to deal with improving the robustness of communication, among other things. RTCP in particular provides out-of-band control information for a Real-time Transport Protocol (RTP) packet stream that conveys voice or other media information between terminals. The receiving terminal of a packet stream can transmit RTCP packets back to the transmitting terminal, in order to report the quality of service being experienced by the receiving terminal. However, this is disadvantageous because it requires either additional standardization across terminals or additional transmission infrastructure, or both.

SUMMARY OF THE INVENTION

The present invention enables a first telecommunications terminal, wireless or otherwise, to report to its user whether a second, wireless telecommunications terminal is receiving the first terminal's packet stream transmissions at a satisfactory quality level. In accordance with the illustrative embodiment of the present invention, the second terminal receives the packet stream that conveys the media waveform transmitted by the first terminal. For example, the media waveform can be that of the speech signal of the first terminal's user. The second terminal measures a trait of the received signal and encodes the measurement data into the packet stream that the second terminal is already transmitting to the first terminal, the packet stream from the second terminal conveying its user's speech signal. The first terminal then decodes the measurement data from the received second stream and presents, to its user, a quality indication based on the decoded data. Since the quality indication is based on the signal received at the second terminal from the first terminal, instead of being based just on the received signal strength as measured by the first terminal, the first terminal's user has a better idea of whether the second terminal has reliably received the user's communication.

In some embodiments, the second terminal, as it receives the packet stream of data transmitted by the first terminal, can perform speech-to-text conversion of the reconstructed speech waveform that is conveyed by the packet stream. Based on the measurement data already generated, the second terminal can then package the converted text, or some part of that text, into a text-based message, such as an SMS message, and transmit the text-based message back to the first terminal. The first terminal then displays the text-based message, thereby enabling its user to determine if what the user has recently spoken has been reliably received by the second terminal.

The invention is based on the idea that if the user of the first terminal is provided with an idea of the signal quality that is present in the radio link at the second terminal, or with information that is affected by that signal quality, then the user has a better idea of whether his speech has been reliably received at the second terminal. In accordance with the illustrative embodiment, the same idea is simultaneously applied in the opposite direction as well, in which the first terminal measures a received signal that conveys a packet stream of a speech waveform from the second terminal, and provides measurement data back to the second terminal and the second terminal's user.

The illustrative embodiment of the present invention features a first telecommunications terminal that comprises: a transmitter interface that transmits, to a second wireless terminal, a first packet stream that conveys a media waveform a(t), which is originated by a user of the first telecommunications terminal; a receiver interface that receives, from the second wireless terminal, a second packet stream into which the second wireless terminal has encoded a first set of one or more measurements of a first predetermined trait of a signal received by the second wireless terminal, the signal representing at least a portion of media waveform a(t); a processor that i) decodes the first set of one or more measurements from the second packet stream and ii) adjusts the value of a predetermined quality indication based on the first set of one or more measurements decoded; and a user interface that presents status that is based on the value of the predetermined quality indication.

DETAILED DESCRIPTION

Figure 1:
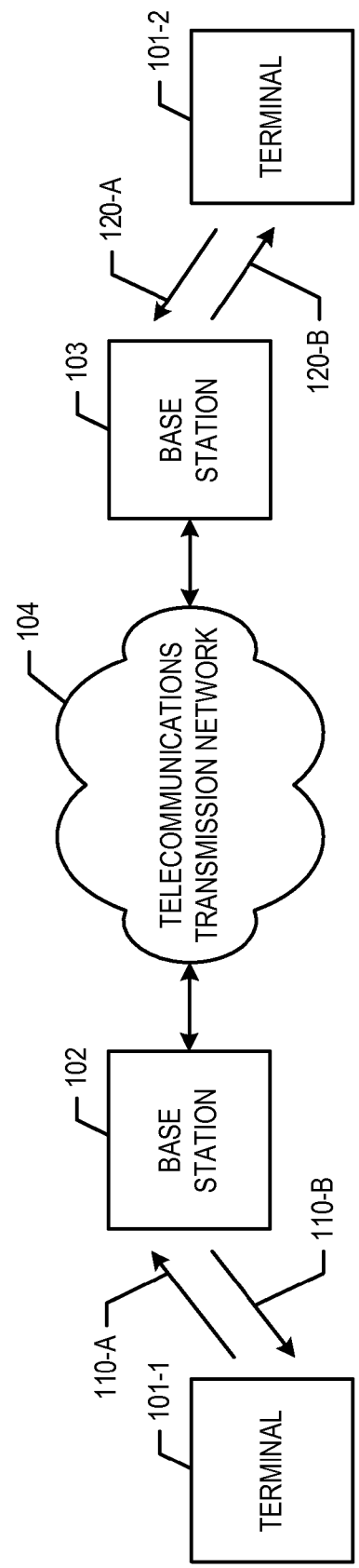
FIG. 1 depicts a block diagram of the salient components of telecommunications system 100, in accordance with the illustrative embodiment of the present invention.

FIG. 1 depicts a block diagram of the salient components of telecommunications system 100, in accordance with the illustrative embodiment of the present invention. System 100 comprises telecommunications terminals 101-1 and 101-2, base stations 102 and 103, and telecommunications transmission network 104, interconnected as shown. Although the system of the illustrative embodiment comprises two wireless terminals, it will be clear to those skilled in the art, after reading this disclosure, how to make and use alternative embodiments of the present invention that comprise any number of telecommunications terminals 101-1 through 101-M, wherein M is a positive integer.

Telecommunications terminal 101-$m$, where m has a value between 1 and M (and where M is equal to two in the illustrative embodiment) is a device that enables its user to communicate with the user of another telecommunications terminal. To this end, terminal 101-$m$ digitizes and encodes a source signal, such as a person's voice or other type of media waveform, transmits the encoded signal to the other terminal, and concurrently receives and decodes a waveform that is being transmitted by the other terminal. The encoded source signals are exchanged in the form of streams of data packets. Depending on the data communications protocol involved, a packet is sometimes referred to as a "frame."

When terminal 101-$m$ is "wireless," it exchanges packet streams with a far-end device by communicating directly and wirelessly with a base station, such as base stations 102 and 103, on an electromagnetic-frequency link that has been provisioned to the call. Terminal 101-$m$ can be a WiFi handset, a cellular telephone, a cordless telephony (CT) device with a signal measurement capability, a notebook computer relying on a wireless LAN, a personal digital assistant (PDA) with a wireless interface, or any other type of device whose direct link with the greater network (i.e., network 104) is over-the-air. Terminals 101-1 and 101-2, as well as additional wireless terminals if present, can be identical to or different from each other; for example, terminal 101-1 can be a WiFi handset and terminal 101-2 can be a cell phone. In some embodiments, a wireless telecommunications terminal communicates with another wireless terminal, while in some alternative embodiments, the wireless terminal communicates with a wired telecommunications terminal. Examples of a wired terminal include a plain old telephone service (POTS) deskset, an IP deskset plugged into a wired LAN, a softphone on a personal computer plugged into a wired LAN, etc.).

Terminal 101-$m$'s salient components are described below and with respect to FIG. 2, and the salient tasks performed by terminal 101-$m$ are described with respect to FIGS. 3 and 4. It will be clear to those skilled in the art, after reading this specification, how to make and use wireless telecommunications terminal 101-$m$.

Base stations 102 and 103 communicate directly via radio link with terminals 101-1 and 101-2, respectively. The base stations provide connectivity, for their served wireless terminals, to the rest of telecommunications system 100. Specifically, base station 102 receives signals from terminal 101-1 via uplink path 110-A and transmits signals to terminal 101-1 via downlink path 110-B, in well-known fashion. Similarly, base station 103 receives signals from terminal 101-2 via uplink path 120-A and transmits signals to terminal 101-2 via downlink path 120-B, in well-known fashion.

Base stations 102 and 103 can be part of the same service provider's network or they can be situated in different networks. Furthermore, depending on the types of wireless terminals they serve, base stations 102 and 103 can communicate by using the same wireless protocol (e.g., CDMA, GSM, UMTS, DECT, WiFi, etc.) or can communicate by using different wireless protocols. In any event, it will be clear to those skilled in the art how to make and use base stations 102 and 103.

Telecommunications transmission network 104 is a network that transports the packet streams associated with calls between two or more telecommunications terminals. Each packet stream can comprise voice, video, and so forth. In accordance with the illustrative embodiment, network 104 comprises packet-switched infrastructure. However, it will be clear to those skilled in the art, after reading this disclosure, how to make and use alternative embodiments of the present invention in which network 104 comprises:

i. the Public Switched Telephone Network (PSTN), or
ii. the Internet, or
iii. one or more other telecommunications networks, or
iv. any combination of i, ii, and iii.

Furthermore, as those who are skilled in the art will appreciate, network 104 can comprise speech transcoders or other types of transcoders, as are known in the art, in order to convert from one type of data representation to another. For example, packets of speech-encoded data might be converted to time-division-multiplexed (TDM) format, the reformatted data then being assigned to a virtual circuit time slot and transported across part of the network in the TDM format.

Figure 2:
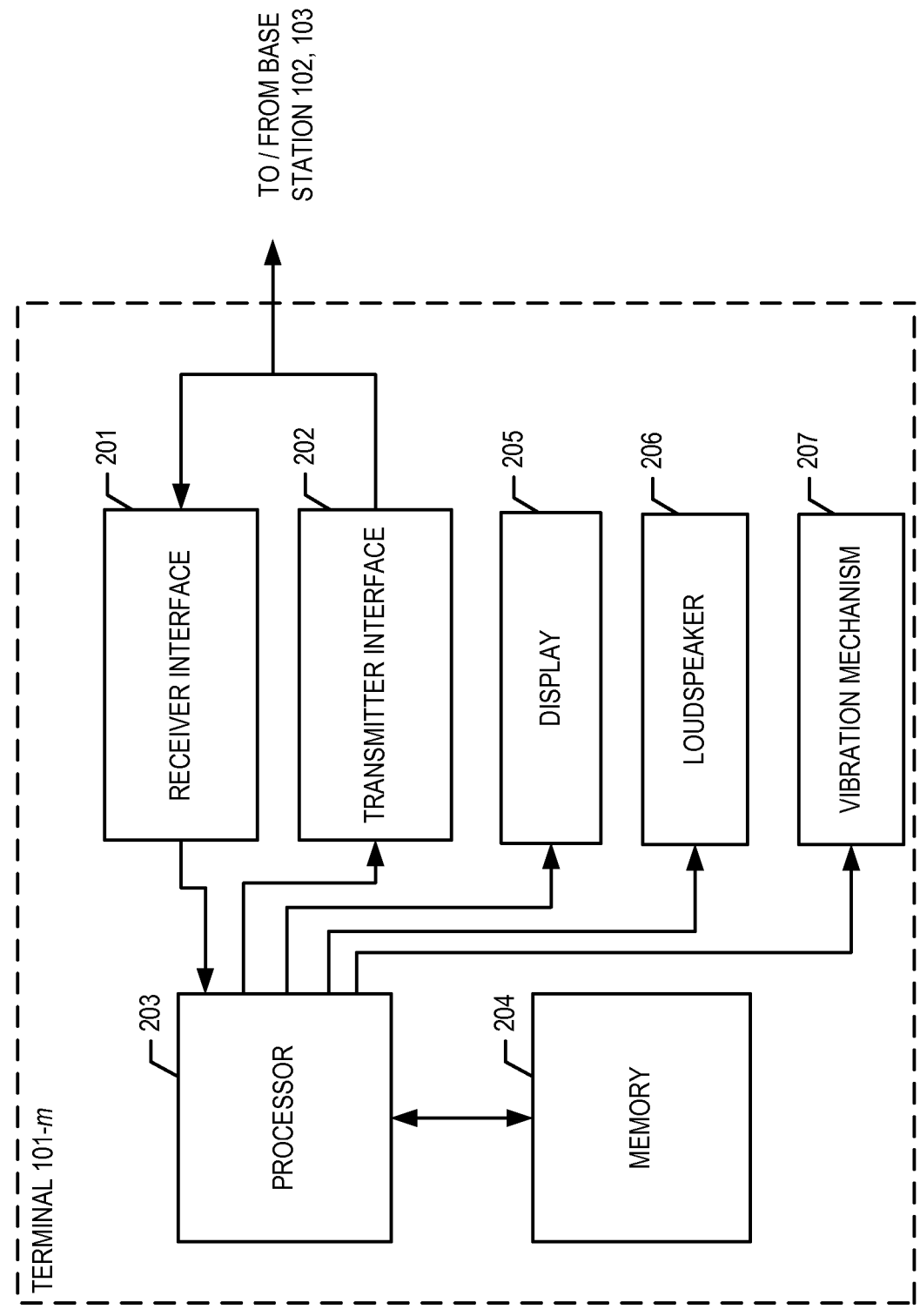
FIG. 2 is a block diagram of the salient components of wireless terminal 101-$m$, in accordance with the illustrative embodiment of the present invention.

FIG. 2 is a block diagram of the salient components of wireless terminal 101-$m$ in accordance with the illustrative embodiment of the present invention, which components are interconnected as shown. In accordance with the illustrative embodiment, wireless terminal 101-$m$ comprises:

i. receiver interface 201,
ii. transmitter interface 202,
iii. processor 203,
iv. memory 204,
v. display 205,
vi. loudspeaker 206, and
vii. vibration mechanism 207.

It will be clear to those skilled in the art, after reading this disclosure, how to make and use alternative embodiments of the present invention in which wireless terminal 101-*m* comprises any subcombination of the components listed above.

Receiver interface 201 and transmitter interface 202 comprise the circuitry that enables terminal 101-*m* to respectively receive signals from and transmit signals to the associated base station, in well-known fashion. In accordance with the illustrative embodiment, terminal 101-*m* receives and transmits media waveform signals that are encoded via the ITU G.729 standard and represented in Voice over Internet Protocol (VoIP) packet streams of data, in well-known fashion. As those who are skilled in the art will appreciate, in some alternative embodiments terminal 101-*m* receives and transmits media waveform signals that are encoded and/or represented in a different format.

Receiver interface 201 further comprises the circuitry that enables terminal 101-*m* to generate signal measurements, in well-known fashion, of one or more traits of electromagnetic signals that it receives from its serving base station, as well as possibly from other electromagnetic signal sources such as other base stations, commercial television transmitters, commercial radio transmitters, navigation transmitters, ground-based aviation transmitters, and so forth.

Processor 203 is a general-purpose processor that is capable of receiving information from receive interface 201, of executing instructions stored in memory 204, of reading data from and writing data into memory 204, and of transmitting information to transmit interface 202. Additionally, processor 203 is able to provide signals to display 205, loudspeaker 206, and vibration mechanism 207. In some alternative embodiments of the present invention, processor 203 might be a special-purpose processor instead of a general-purpose processor.

Processor 203 is further capable of encoding signal measurements into the packet stream that is intended for another terminal. Processor 203 is also capable of decoding, from a received packet stream, information that is related to signal measurements as provided by another terminal. In some embodiments, processor 203 is also capable of speech-to-text conversion into a text string of a speech waveform that it receives from another terminal during a call.

Memory 204 stores the instructions and data used by processor 203, in well-known fashion. Memory 204 can be any combination of dynamic random-access memory (RAM), flash memory, disk drive memory, and so forth.

Display 205 is part of the user interface of terminal 101-*m*. In accordance with the illustrative embodiment, display 205 comprises a liquid crystal display that is able to present the terminal's user with a visual representation of status. It will be clear to those skilled in the art how to make and use alternative embodiments of the present invention in which display 205 comprises a display that is other than liquid crystal-based. In any event, it will be clear to those skilled on the art how to make and use display 205.

Loudspeaker 206 is another part of the user interface of terminal 101-*m*. In accordance with the illustrative embodiment, loudspeaker 206 is able to present the terminal's user with an audible representation of status. As those who are skilled in the art will appreciate, in some alternative embodiments of terminal 101-*m*, loudspeaker 206 can instead be a type of electro-acoustic transducer other than a loudspeaker, such as an earpiece. In any event, it will be clear to those skilled on the art how to make and use loudspeaker 206.

Vibration mechanism 207 is yet another part of the user interface of terminal 101-*m*. In accordance with the illustrative embodiment, mechanism 207 is able to present the terminal's user with a tactile representation of status. It will be clear to those skilled on the art how to make and use vibration mechanism 207.

In accordance with the illustrative embodiment, one or more components of terminal 101-*m* perform the tasks described below and with respect to FIGS. 3 and 4. As those who are skilled in the art will appreciate, the described tasks can be performed by different combinations of terminal 101-*m*'s components, across various embodiments of the present invention.

Figure 3:
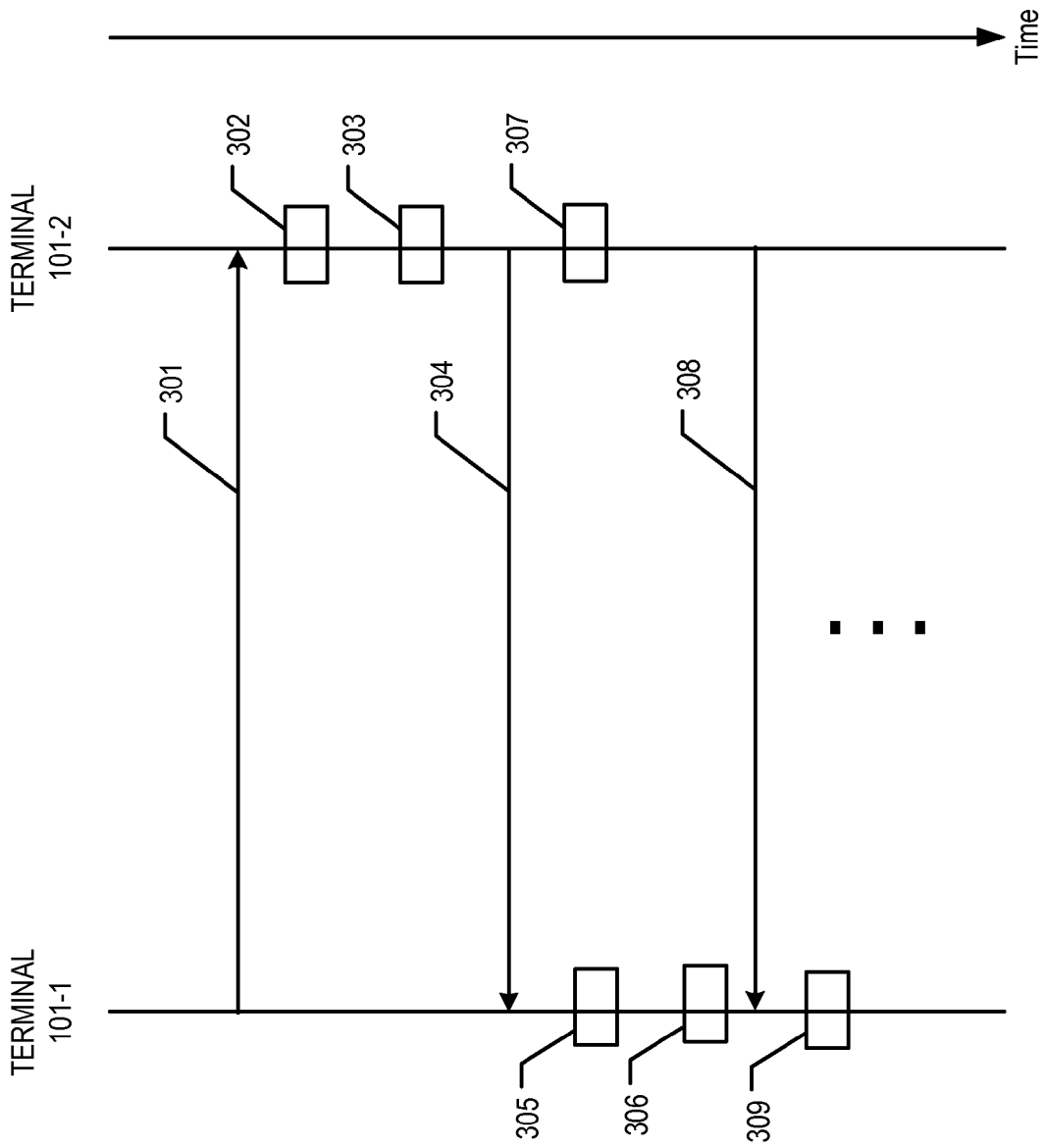
FIG. 3 depicts a diagram of the salient messages and tasks that are related to exchanging packet streams, as well as to exchanging measurement information of one or more traits of signals that convey those packet streams, in accordance with the illustrative embodiment of the present invention.
Figure 4:
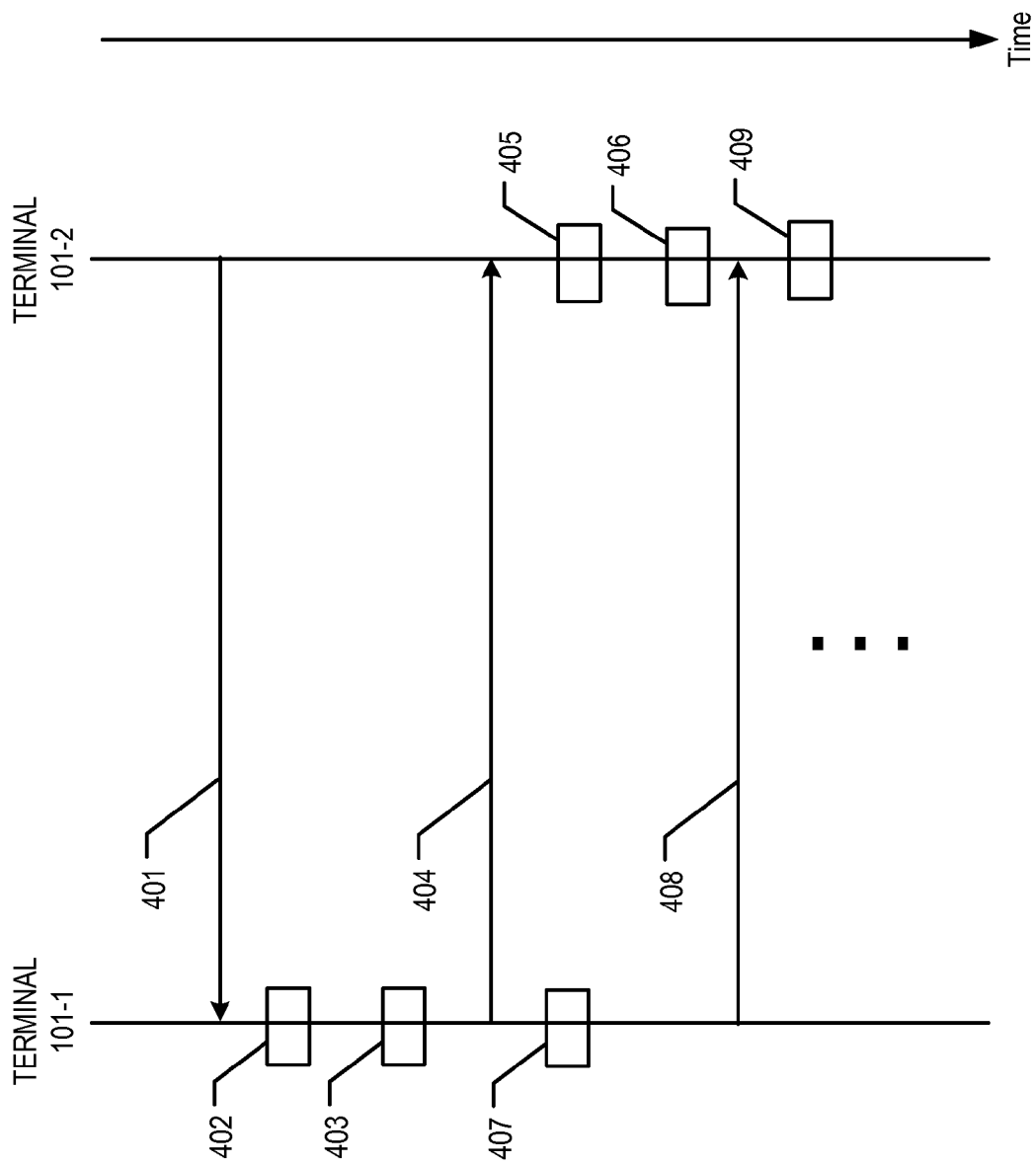
FIG. 4 depicts how terminals 101-1 and 101-2 perform the tasks that were performed by terminals 101-2 and 101-1, respectively, in FIG. 3.

FIG. 3 depicts a diagram of the salient messages and tasks that are related to exchanging packet streams, as well as to exchanging measurement information of one or more traits of signals that convey those packet streams, in accordance with the illustrative embodiment of the present invention. As those who are skilled in the art will appreciate, some of the messages and tasks that appear in the diagram can be performed in parallel or in a different order than that depicted. Moreover, those who are skilled in the art will further appreciate that in some alternative embodiments of the present invention, only a subset of the depicted messages and tasks are performed.

As depicted in FIG. 3, wireless terminals 101-1 and 101-2 are exchanging packet streams of data, each of which represents a media waveform, as part of a two-way call with each other. In accordance with the scenario, terminals 101-1 and 101-2 exchange digitized waveforms of their user's voices. However, as those who are skilled in the art will appreciate, in other scenarios, two or more terminals can exchange other types of media, in accordance with the techniques described herein. Furthermore, in some alternative embodiments, a wireless terminal can exchange packet streams of data with a wired terminal; in the process, the wireless terminal can generate signal measurements with respect to the signal received from the wired terminal and can then transmit representations of those measurements back to the wired terminal.

As part of a call, terminal 101-1 transmits packet stream 301 to terminal 101-2, which packet stream conveys a first media waveform a(t), which is a representation of the voice of terminal 101-1's user during the call.

Terminal 101-2 receives packet stream 301 and, at task 302, generates a first set of one or more signal measurements of one or more traits of a signal that it receives from base station 103, the signal conveying a representation of waveform a(t). In some embodiments, terminal 101-2 also generates measurements of one or more traits of signals that are received from one or more additional transmitters.

In accordance with the illustrative embodiment, each set of measurements comprises measurement data of one or more of the following signal traits of signals received from one or more transmitters (e.g., base stations 102 and 103, commercial television, commercial radio, navigation, ground-based aviation, etc.):

i. the received signal strengths of signals received by terminal 101-2; and ii. the received signal-to-impairment ratios of signals received by terminal 101-2; and iii. the bit-error rate (BER) or frame-error rate (FER) of signals received by terminal 101-2; and iv. the path-losses of signals received by terminal 101-2; and v. the received temporal difference of each pair of multi-path components of signals received by terminal 101-2; and vi. the received delay spreads of signals received by terminal 101-2; and vii. the received relative arrival times of two or more multipath components of signals received by terminal 101-2; and viii. the round-trip time of signals transmitted and received by terminal 101-2 through one or more base stations.

As those who are skilled in the art will appreciate, in some embodiments base station 103 can generate measurement data in the uplink direction of one or more of the traits listed above of signals that the base station receives, and can then make available those measurements to terminal 101-2, or to terminal 101-1 for that matter.

Terminal 101-2, at task 303, then encodes the first set of one or more signal measurements into a second packet stream that conveys a media waveform b(t), namely packet stream 304, and transmits the packet stream to terminal 101-1. The waveform b(t) is originated by a user of terminal 101-2 and represents, for example, the user's voice. In some embodiments, the encoding is based on the values of the measurements; for example, if the signal measurement is at a satisfactory level, then encoding and transmission of the measurements might be unnecessary and might not be performed.

As those who are skilled in the art will appreciate, there are various ways to encode the measurement data into the packet stream. For example, a representation of the measurement data can be mixed into the media waveform as a low-volume and/or high-pitch signal. As another example, U.S. application Ser. No. 11/675,345, filed on Feb. 15, 2007 and incorporated herein by reference, discloses the transmission of a digital message (e.g., measurement data, etc.) along with a corresponding media waveform, without adding any additional bits to the packet stream that conveys the waveform. Based on an evaluation of the perceptual significance of each digitized bit of the media waveform, the technique disclosed in the referenced application: (i) determines which digitized bits can be overwritten; and (ii) intersperses the digital message bits throughout the digitized waveform in place of the over-writeable bits.

In some alternative embodiments, terminal 101-2 might instead encode the measurement data into another type of conveyance, such as into one or more SMS messages, before transmitting the measurement data to terminal 101-1.

In some embodiments, at task 307, terminal 101-2 analyzes the received representation of waveform a(t) and performs speech-to-text conversion on the waveform, in well-known fashion, thereby converting the waveform into a text string. Then, terminal 101-2 transmits text-based message 308 to terminal 101-1, which message conveys the text string. As those who are skilled in the art will appreciate, after reading this specification, i) the speech-to-text conversion can be invoked based on one or more values of the first set of one or more signal measurements generated, or ii) the transmission of the text-based message can be performed based on one or more values of the first set of one or more signal measurements generated, or both. In some embodiments, the text string comprises N characters converted from the more recently-received portion of the speech waveform a(t), where N is a positive integer and can be based on an operator-imposed limit on the number of characters transmitted per message.

Meanwhile, at task 305 terminal 101-1 receives packet stream 304, and decodes the first set of one or more measurements from the second packet stream. Alternatively, if terminal 101-2 has transmitted the measurement data via other means, terminal 101-1 decodes the data from the other type of conveyance.

At task 306, terminal 101-1 adjusts the value of a predetermined quality indication, based on the first set of one or more signal measurements decoded at task 305. In some embodiments, the adjustment can also be based on measurements that terminal 101-1 itself generates or obtains of one or more predetermined traits of one of more signals that the terminal receives, such as from base station 102. Those possible traits and signal sources are described above and with respect to task 302. Terminal 101-1 then presents status to the user of terminal 101-1, wherein the status is based on the value of the predetermined quality indication.

The method of presentation to terminal 101-1's user (e.g., visual, audible, tactile, etc.), in some embodiments, depends on the value of the quality indication as adjusted at task 306. Furthermore, in some other embodiments, the method of presentation to the user depends on the audio mode in which the user operates terminal 101-1 (e.g., with a handset, with a headset, with a speaker, etc.). For example, if the user operates terminal 101-1 using an audio mode in which the terminal is held close to the ear, it might be more effective to provide a tactile sensation to the user for the purpose of providing the quality status. As those who are skilled in the art will appreciate, the presentation method can be based on a combination of the quality indication value, the audio mode, and other characteristics of terminal 101-1, the user, the call, and/or the information exchanged between terminals.

If the presentation method is visual, display 205 can render the value of the quality indication in one or more of a variety of formats, such as by using different numbers, different colors, different numbers of bars, smiley face/frowning face icons, and so forth.

In some embodiments, terminal 101-1 adjusts the number of bits transmitted per unit time in packet stream 301 going forward, based on the measurement data received from terminal 101-2 and decoded, or obtained by terminal 101-1 itself, at task 305. For example, if the measurement data appear to be favorable, the number of bits transmitted to terminal 101-2 might be decreased with little or no effect in waveform quality—for example, by changing the speech encoding (i.e., vocoding) process. As those who are skilled in the art will appreciate, the decision to increase or decrease the number of bits transmitted, as well as by how much, can depend on other factors as well.

At task 309, in those embodiments in which terminal 101-2 has transmitted text-based message 308, terminal 101-1 receives and displays message 308 in well-known fashion. The user of terminal 101-1 is able to examine the contents of the message to see if what she has recently spoken has been reliably received by terminal 101-2.

Throughout the duration of the call, terminals 101-1 and 101-2 continually perform the tasks and exchange the messages described with respect to FIG. 3. Furthermore, in some embodiments, terminals 101-1 and 101-2 perform each other's roles. In other words, as depicted in FIG. 4, terminal 101-1 performs the tasks that were performed by terminal 101-2 in FIG. 3, and terminal 101-2 performs the tasks that were performed by terminal 101-1 in FIG. 3. This reflected by packet stream 401, which conveys media waveform b(t), being transmitted by terminal 101-2, terminal 101-1 at task 402 generating signal measurements of the signal conveying waveform b(t) received through base station 102, and so forth, where tasks 401 through 409 correspond to tasks 301 through 309, respectively.

As those who are skilled in the art will appreciate, after reading this specification, the wireless terminal of the illustrative embodiment can exchange packet streams, as well as analyze the waveform content of those packet streams, as part of a three-way call. In a three-way call (e.g., involving terminals 101-1, 101-2, and 101-3, etc.), at least one terminal, such as terminal 101-1, exchanges packet streams with two other terminals, such as terminals 101-2 and 101-3. In that case, terminal 101-1 would perform the techniques of the illustrative embodiment both on the packet streams associated with terminal 101-2, as described earlier, and on the packet streams associated with terminal 101-3.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A telecommunications terminal comprising:
    a transmitter interface that transmits, to a wireless terminal, a first packet stream that conveys a media waveform a(t);
    a receiver interface that receives, from the wireless terminal, a second packet stream conveying a speech waveform b(t) and having a measurement of a trait of a signal received by the wireless terminal, the signal representing at least a portion of the media waveform a(t);
    a processor that i) decodes the measurement from the second packet stream, ii) adjusts a value of a quality indication based on the measurement, and iii) converts the speech waveform b(t) into a text string;
    a user interface that presents a status that is based on the value of the quality indication, wherein the transmitter interface transmits a text-based message that conveys the text string to the wireless terminal.

2. The telecommunications terminal of claim 1, wherein the telecommunications terminal operates in accordance with a wireless protocol.

3. The telecommunications terminal of claim 1 wherein the text string comprises N characters converted from a more recently-received portion of the speech waveform b(t), N being a positive integer.

4. The telecommunications terminal of claim 1 wherein the receiver interface generates a second measurement of a second trait of a second signal that conveys the second packet stream, and wherein the transmission of the text-based message is based on the second measurement.

5. The telecommunications terminal of claim 4, wherein the processor encodes the second measurement into the first packet stream.

6. The telecommunications terminal of claim 5, wherein the second measurement is encoded into the first packet stream based on a measurement value of the second measurement.

7. A wireless terminal comprising:
    a receiver interface that
        i) receives, from a telecommunications terminal, a signal that represents a first packet stream that conveys a media waveform a(t), and
        ii) generates a first measurement of a trait of the signal;
    a processor that encodes the first measurement into a second packet stream that conveys a speech waveform b(t), and converts the speech waveform b(t) into a text string; and
    a transmitter interface that transmits, to the telecommunications terminal, the second packet stream that comprises the first measurement, and a text-based message that conveys the text string.

8. The wireless terminal of claim 7, wherein the measurement is encoded into the second packet stream based on a measurement value of the measurement.

9. The wireless terminal of claim 7, wherein the processor decodes a second measurement from the first packet stream and adjusts a value of a quality indication based on the second measurement.

10. The wireless terminal of claim 9, wherein the transmission of the text-based message is based on the first measurement.

11. The wireless terminal of claim 9 wherein the text string comprises N characters converted from a more recently-received portion of the speech waveform b(t), N being a positive integer.

12. A method comprising:
    receiving, via a receiver interface, a signal that represents a first packet stream that conveys a media waveform a(t);
    generating, via the receiver interface, a measurement of a trait of the signal;
    encoding the measurement into a second packet stream that conveys a speech waveform b(t);
    converting, via a processor, the speech waveform b(t) into a text string; and
    transmitting, via a transmitter interface, the second packet stream comprising the measurement and a text-based message that conveys the text string.

13. The method of claim 12, wherein the measurement is encoded into the second packet stream based on a measurement value of the measurement.

14. The method of claim 13, wherein the conversion of the speech waveform b(t) into the text string is based on the measurement.

15. The method of claim 13, wherein transmitting the second packet stream comprising the measurement and the text-based message is based on the measurement.

16. The method of claim 15, wherein the text string comprises N characters converted from a more recently-received portion of the speech waveform b(t), N being a positive integer.

17. The method of claim 12, further comprising decoding a second measurement from the first packet stream and adjusting a quality value of a quality indication based on the second measurement.

\* \* \* \* \*